US012618772B2

(12) United States Patent
Yasuda et al.

(10) Patent No.: US 12,618,772 B2
(45) Date of Patent: May 5, 2026

(54) OPTICAL PHYSICAL QUANTITY MEASURING APPARATUS

(71) Applicant: Asahi Kasei Microdevices Corporation, Tokyo (JP)

(72) Inventors: Daiki Yasuda, Tokyo (JP); Shota Isshiki, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 328 days.

(21) Appl. No.: 18/586,538

(22) Filed: Feb. 26, 2024

(65) Prior Publication Data

US 2024/0295493 A1     Sep. 5, 2024

(30) Foreign Application Priority Data

Mar. 2, 2023   (JP) ................................. 2023-032266
Jan. 16, 2024   (JP) ................................. 2024-004727

(51) Int. Cl.
*G01N 21/3504*          (2014.01)

(52) U.S. Cl.
CPC . *G01N 21/3504* (2013.01); *G01N 2201/0636* (2013.01)

(58) Field of Classification Search
CPC ........... G01N 21/0636; G01N 21/3504; G01N 2201/3148
See application file for complete search history.

(56) References Cited

U.S. PATENT DOCUMENTS

| | | | | |
|---|---|---|---|---|
| 3,696,247 | A | * 10/1972 | McIntosh | ............ F02D 41/1451 |
| | | | | 250/573 |
| 6,710,347 | B1 | * 3/2004 | Eden | .................. G01N 21/3504 |
| | | | | 250/336.1 |
| 2014/0306112 | A1 | * 10/2014 | Starta | ..................... G01N 21/59 |
| | | | | 250/338.5 |
| 2018/0120224 | A1 | * 5/2018 | Dreyer | ..................... A61B 5/08 |
| 2018/0306951 | A1 | * 10/2018 | Mahvan | .................. G02B 5/09 |
| 2019/0072489 | A1 | 3/2019 | Camargo et al. | |

(Continued)

FOREIGN PATENT DOCUMENTS

| | | |
|---|---|---|
| JP | H09318528 A | 12/1997 |
| JP | 2003014639 A | 1/2003 |

(Continued)

*Primary Examiner* — Edwin C Gunberg
(74) *Attorney, Agent, or Firm* — KENJA IP LAW PC

(57) ABSTRACT

An optical physical quantity measuring apparatus (1) includes a light-emitting element (L), light-receiving elements (S) including at least a first light-receiving element and a second light-receiving element, and a reflector. The light-emitting element has a different radiation spectrum depending on a radiation direction and emits light at least at a first radiation angle, a second radiation angle, and a third radiation angle into a space in which an object to be measured is located. The reflector causes light emitted from the light-emitting element in different radiation directions to reach different positions. The first light-receiving element is arranged in an optical path formed by light emitted at the first radiation angle. The second light-receiving element is arranged in an optical path formed by light emitted at the second radiation angle. An absorber or a void is provided in an optical path formed by light emitted at the third radiation angle.

20 Claims, 11 Drawing Sheets

(56)  References Cited

U.S. PATENT DOCUMENTS

2020/0363328 A1* 11/2020 Le .......................... G01N 21/274
2021/0293723 A1* 9/2021 Ohno ..................... G01N 21/85

FOREIGN PATENT DOCUMENTS

| | | | |
|---|---|---|---|
| JP | 2022055317 | A | 4/2022 |
| JP | 2022063219 | A | 4/2022 |
| WO | 2015045411 | A1 | 4/2015 |
| WO | 2023009605 | A1 | 2/2023 |

* cited by examiner

FIG. 4

OPTICAL PHYSICAL QUANTITY MEASURING APPARATUS

CROSS-REFERENCE TO RELATED APPLICATIONS

The present application claims priority to Japanese Patent Application No. 2023-032266 filed on Mar. 2, 2023 and Japanese Patent Application No. 2024-004727 filed on Jan. 16, 2024, the entire contents of which are incorporated herein by reference.

TECHNICAL FIELD

The present disclosure relates to an optical physical quantity measuring apparatus.

BACKGROUND

As an optical physical quantity measuring apparatus, a non-dispersive infrared absorption type gas concentration measuring apparatus is known, for example. The non-dispersive infrared absorption type gas concentration measuring apparatus is known as a highly accurate gas sensor that is based on how gas molecules have a unique absorption band for mid-infrared light. This gas sensor operates as follows. First, infrared light is irradiated from an infrared light source onto gas in the optical path. Infrared light transmitted through the gas is guided by the optical path to an infrared detector, and the amount of light reaching the detector is measured. In this case, provision of a bandpass filter in the optical path before the light enters the infrared detector can restrict the light reaching the infrared detector to the infrared light in the absorption band specific to the gas molecules. The amount of light reaching the detector diminishes according to the concentration of gas in the optical path in accordance with the Beer-Lambert law. The gas concentration can be calculated based on the amount of light reaching the detector. Therefore, in a case of fluctuations in the intensity of light irradiated from the light source, fluctuations in the reflectance of the optical path, fluctuations in the characteristics of the infrared detector, or the like, large errors occur in the gas concentration calculation, making it difficult to measure the gas concentration accurately. Factors that cause such fluctuations include, for example, temperature changes, the effect of stress associated with humidity, an unclean optical path, and the effect of interfering gases.

A method using a reference signal is known as a method to suppress the effects of such fluctuations. This method uses a main signal obtained by detecting only light, irradiated from a light source, in the absorption band sensitive to the gas concentration and a reference signal obtained by detecting light, irradiated from the same light source, with less sensitivity to changes in gas concentration. For example, by taking the ratio of these signals, the effect of fluctuations in the intensity of the light source and the like can be suppressed. Here, the main signal is obtained by detecting, with an infrared detector, light transmitted through a bandpass filter that transmits wavelengths specific to the gas to be detected. On the other hand, various methods for obtaining the reference signal are known. Patent Literature (PTL) 1 discloses a method of detecting light of all wavelengths emitted by a light source using an infrared detector formed on the same substrate as the light source. PTL 2 discloses a method of detection using an infrared detector with a bandpass filter that, unlike the main signal bandpass filter, transmits wavelengths that are not sensitive to the gas to be detected.

CITATION LIST

Patent Literature

PTL 1: WO2015/045411
PTL 2: JP H9-318528 A

SUMMARY

The method of detecting all wavelengths as a reference signal has the problem, however, of not being able to fully compensate for changes in spectral shape due to fluctuations in characteristics. The method of detecting all wavelengths as a reference signal is a method in which a signal obtained by integrating the product of the emission intensity of the emission spectrum and the spectral sensitivity of the detector over all wavelengths is used as the reference signal, and a signal obtained by integrating the product of a portion of the emission spectrum and the spectral sensitivity of the detector over all wavelengths is used as the main signal. The method using a plurality of optical filters corresponding to a plurality of wavelengths is superior in terms of suppressing fluctuations in characteristics but has the problem of increasing the size of the apparatus.

It would be helpful to provide a compact yet highly accurate optical physical quantity measuring apparatus.

(1) An optical physical quantity measuring apparatus according to an embodiment of the present disclosure includes:

a light-emitting element, a plurality of light-receiving elements including at least a first light-receiving element and a second light-receiving element, and a reflector, wherein the light-emitting element has a different radiation spectrum depending on a radiation direction, and emits light at least at a first radiation angle, a second radiation angle, and a third radiation angle into a space in which an object to be measured is located, the reflector causes light emitted from the light-emitting element in different radiation directions to reach a plurality of different positions, the first light-receiving element is arranged in an optical path along which the light emitted at the first radiation angle travels, the second light-receiving element is arranged in an optical path along which the light emitted at the second radiation angle travels, and an absorber or a void is provided in an optical path along which the light emitted at the third radiation angle travels.

(2) As an embodiment of the present disclosure, in (1), the plurality of light-receiving elements is formed on a same substrate.

(3) As an embodiment of the present disclosure, in (2), the substrate is a semiconductor substrate, and the light-receiving elements are semiconductor elements formed on the semiconductor substrate.

(4) As an embodiment of the present disclosure, any one of (1) to (3) further includes a molded resin part that seals at least a portion of the plurality of light-receiving elements.

(5) As an embodiment of the present disclosure, in (4), the plurality of light-receiving elements is arranged symmetrically with respect to the molded resin part in plan view.

(6) As an embodiment of the present disclosure, in any one of (1) to (5), the light-emitting element comprises wavelength limiting means, and the light-emitting element has the different radiation spectrum depending on the radiation direction due to incident angle dependence of a wavelength transmitted by the wavelength limiting means.

(7) As an embodiment of the present disclosure, in (6), the wavelength limiting means is an optical interference filter using a dielectric multilayer film.

(8) As an embodiment of the present disclosure, in (7), the dielectric multilayer film is formed from a material with a refractive index of less than 2.5.

(9) As an embodiment of the present disclosure, in (6), the wavelength limiting means is a diffraction grating.

(10) As an embodiment of the present disclosure, in (6), the wavelength limiting means is a metamaterial.

(11) As an embodiment of the present disclosure, in any one of (6) to (10), the wavelength limiting means is provided in proximity to the light-emitting element.

(12) As an embodiment of the present disclosure, in any one of (6) to (11), the wavelength limiting means is in physical contact with the light-emitting element.

(13) As an embodiment of the present disclosure, in any one of (1) to (12), a light-emitting region of the light-emitting element includes a microstructure.

(14) As an embodiment of the present disclosure, in any one of (1) to (13), the light-emitting element is a light-emitting element that uses semiconductor luminescent recombination.

(15) As an embodiment of the present disclosure, in any one of (1) to (14), the light-emitting element is a resonant-cavity light-emitting diode or a vertical cavity surface emitting laser.

(16) As an embodiment of the present disclosure, in any one of (1) to (15), the light-emitting element and the plurality of light-receiving elements have a reception and emission wavelength of 1 µm to 12 µm, and a gas concentration is calculated based on an amount of light absorption by gas molecules present in an optical path.

(17) As an embodiment of the present disclosure, any one of (1) to (16) further includes a plurality of light-emitting elements, wherein at least one of the plurality of light-receiving elements is arranged at a position reached by light emitted from both of two light-emitting elements in the plurality of light-emitting elements.

(18) As an embodiment of the present disclosure, in any one of (1) to (17), at least one of the plurality of light-receiving elements comprises a second wavelength limiting means.

(19) As an embodiment of the present disclosure, in any one of (1) to (18), the reflector has a reflective surface that is a quadratic surface.

(20) As an embodiment of the present disclosure, in (19), the reflector comprises metal as the reflective surface integrally formed on top of resin.

(21) As an embodiment of the present disclosure, in any one of (1) to (20), the third radiation angle is an angle between the first radiation angle and the second radiation angle.

(22) As an embodiment of the present disclosure, in any one of (1) to (21), the absorber is provided in the optical path along which the light emitted at the third radiation angle travels, and the absorber is a portion of a molded resin part that seals at least a portion of the plurality of light-receiving elements or the absorber is a portion of the molded resin part that forms the reflector.

(23) As an embodiment of the present disclosure, in any one of (1) to (22), the absorber or the void is provided at a position in the reflector between a reflection position of the light emitted at the first radiation angle and a reflection position of the light emitted at the second radiation angle.

(24) As an embodiment of the present disclosure, in (23), the absorber is provided in the optical path along which the light emitted at the third radiation angle travels, and the absorber is a portion of uncoated resin forming the reflector.

According to the present disclosure, a compact yet highly accurate optical physical quantity measuring apparatus can be provided.

BRIEF DESCRIPTION OF THE DRAWINGS

In the accompanying drawings:

FIG. 4 is a configuration diagram illustrating an optical physical quantity measuring apparatus according to an embodiment;

DETAILED DESCRIPTION

Figure 1:
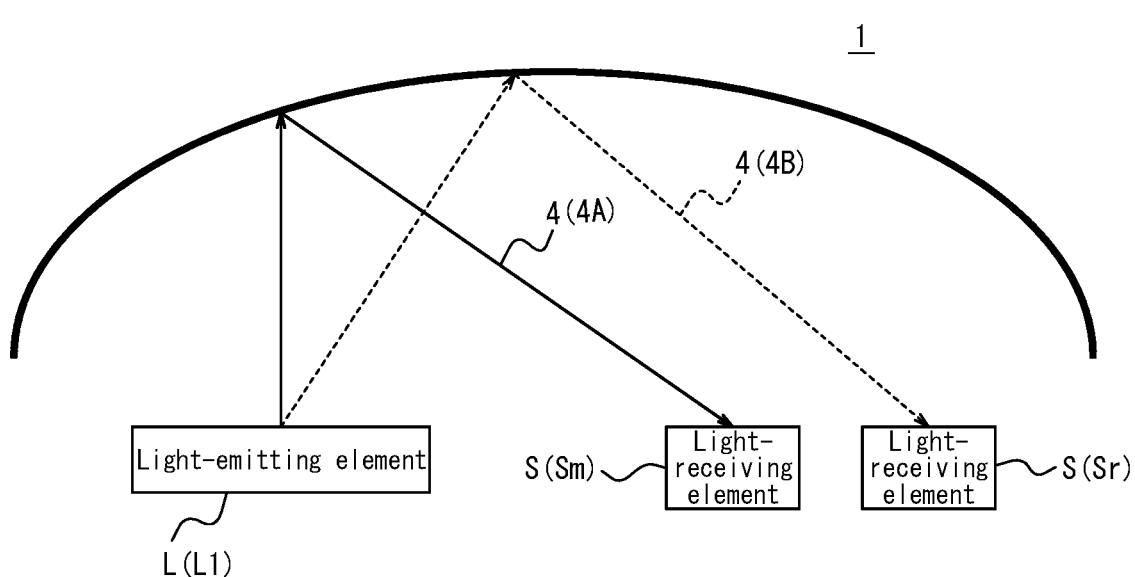
FIG. 1 is a configuration diagram illustrating an optical physical quantity measuring apparatus according to an embodiment.

An optical physical quantity measuring apparatus according to embodiments of the present disclosure is described below with reference to the drawings.

<Optical Physical Quantity Measuring Apparatus>

A substance in the region through which light passes exhibits different absorption for light of different wavelengths. Utilizing this principle, an optical physical quantity measuring apparatus detects the concentration of a substance by detecting transmitted light for light of a plurality wavelengths. For example, light passes through the internal space of a region partitioned within the apparatus and is absorbed when a gas or liquid containing the substance to be detected is introduced into the internal space. Here, a substance being present in such an internal space is also described below as "present in the optical path". The optical physical quantity measuring apparatus is also applied in a case in which a solid containing the substance to be detected is placed in the internal space.

For example, carbon dioxide ($CO_2$) and hydrocarbons, which are gas molecules, have absorption bands near 4.3 µm and 3.3 µm, respectively, whereas absorption is very small near 3.9 µm. In other words, the signal from a light-receiving element that detects light at 4.3 µm and 3.3 µm decreases as the respective concentrations of carbon dioxide and hydrocarbons increase. In contrast, the signal from a light-receiving element that detects light near 3.9 µm exhibits very little change with respect to the concentration of these gases. Accordingly, an optical physical quantity measuring apparatus can be used as a gas sensor that calculates the carbon dioxide concentration or hydrocarbon concentration present in the optical path by comparing the amounts of light transmitted (or diminished) near 4.3 µm and 3.9 µm, or near 3.3 µm and 3.9 µm. In the case of the substance in the optical path being a liquid, the optical physical quantity measuring apparatus can be used to detect impurities in the liquid. One example is the measurement of the concentration of organic carbon in a liquid.

In an optical physical quantity measuring apparatus, light emitted from a light-emitting element has a different radiation spectrum depending on the radiation direction. Light in different radiation directions from the light-emitting element forms optical paths that reach a plurality of different positions, and the light is detected by a plurality of light-receiving elements arranged at the plurality of positions. A comparison of this plurality of signals yields highly accurate measurement of physical quantities, with suppression of fluctuations in the light-emitting element and light-receiving elements due to temperature, humidity, and the like. A plurality of radiation spectra can thus be extracted from a single light source, and the number of components can be reduced, such as dispensing with use of a plurality of optical filters, thereby reducing the size and suppressing a decline in measurement accuracy associated with ensuring design tolerance.

In a case in which the optical physical quantity measuring apparatus is a gas sensor, the light-emitting element and light-receiving elements emit and receive light in a wavelength range of 1 µm to 12 µm, for example. In other words, the reception and emission wavelength is 1 µm to 12 µm. To enable further miniaturization, a light-emitting diode and photodiodes made of AlInSb or InAsSb are preferably used as the combination of the light-emitting element and the light-receiving elements. However, as explained below, the combination of the light-emitting element and the light-receiving elements is not limited to these examples.

<Light-Emitting Element>

The light-emitting element has a different radiation spectrum depending on the radiation direction. For example, a lamp, a light-emitting diode, an MEMS emitter, or the like is used as the light-emitting element. These light sources can also be combined with wavelength limiting means (described below) to achieve a different radiation spectrum depending on the radiation direction. The light-emitting element may be a light-emitting element that uses semiconductor luminescent recombination. A resonant-cavity light-emitting diode and a vertical cavity surface emitting laser are also preferable as the light-emitting element, as they have an internal resonator and can emit light with a different radiation spectrum depending on the radiation direction. Similarly, light-emitting diodes and MEMS emitters with microstructures added to the light-emitting region are also preferable as they can emit light with a different radiation spectrum depending on the direction of the light-emitting surface. The light-emitting element may be at least partially sealed by a molded resin. Stating that the light-emitting element "has a different radiation spectrum depending on the radiation direction" includes, for example, the central wavelength of the radiation spectrum of the light-emitting element being shifted towards a shorter wavelength, for example, as the angle relative to a direction perpendicular to the radiation plane increases. Here, it is assumed that the radiation spectrum of the light-emitting element exhibits a substantially Gaussian distribution around a certain central wavelength. The substantially Gaussian distribution includes a wider half-width or reduced intensity of the Gaussian distribution. By the major wavelength component changing according to the radiation direction of the light-emitting element, the major wavelength component of the light reaching the plurality of light-receiving elements that receive the light in the respective radiation directions changes. As a result, the degree of attenuation of the detection signal indicating the amount of light absorbed by gas molecules present in the optical path, for example, differs among the plurality of light-receiving elements. In other words, since signals with different sensitivity to gas concentration can be obtained, the concentration of gas molecules in the optical path can be calculated by comparing the signals obtained from this plurality of light-receiving elements.

A plurality of light-emitting elements may be provided. By provision of a plurality of light-emitting elements, signals can be obtained for more wavelengths than with a single light source. The effect of fluctuations in characteristics of a device and the effect of interfering gases can therefore be further suppressed. Different types of gas concentrations can also be measured simultaneously.

<Light-Receiving Element>

The light-receiving elements are arranged at different positions in the optical path and detect light that is emitted from the light-emitting elements and has different radiation spectra. A plurality of the light-receiving elements is provided. Two light-receiving elements, for example, are used in the example of a gas sensor for detecting carbon dioxide or hydrocarbons. By increasing the number of light-receiving elements, the effect of fluctuations in characteristics of the device and the effect of interfering gases can be further suppressed. Different types of gas concentrations can also be measured simultaneously.

Photodiodes, photoconductors, thermopiles, pyroelectric sensors, and the like may be used as the light-receiving elements. In a case in which a plurality of light-emitting elements is provided, as described above, the light-receiving elements may detect light that is emitted from the plurality of light-emitting elements and has different radiation spectra. By detecting and comparing light in a plurality of wavelength bands, it is possible to suppress the effect of fluctuations in the characteristics of the device and the effect of interfering gases or to simultaneously measure different types of gas concentrations.

A plurality of light-receiving elements can be formed on the same substrate. The substrate may be a printed board or a ceramic substrate. A plurality of individually packaged light-receiving elements may be mounted on the substrate. A structure in which a plurality of light-receiving element chips is mounted on a substrate and packaged together may be adopted.

The plurality of light-receiving elements can be formed on the same semiconductor substrate. The plurality of light-receiving elements may be semiconductor elements formed on the semiconductor substrate. A plurality of light-receiving elements is preferably manufactured on a semiconductor substrate using the same process, as doing so will form the light-receiving elements with uniform characteristics and reduce factors that may cause fluctuations or deviations when comparing the signals of the plurality of light-receiving elements. The light to be detected may be directly incident on the light-receiving elements or may be transmitted through the semiconductor substrate and then incident on the light-receiving elements. In this case, the semiconductor substrate is preferably a transparent substrate with respect to the light to be transmitted. For example, GaAs, GaSb, InAs, InP, and Si substrates can be used as substrates that transmit mid-infrared light. The plurality of light-receiving elements may be at least partially sealed by a molded resin part. In this case, the plurality of light-receiving elements may be arranged symmetrically with respect to the molded resin part in plan view. With respect to fluctuations in characteristics caused by differences in physical properties between the plurality of light-receiving elements and the molded resin, a symmetrical arrangement makes it easier to compensate for the effect of such fluctuations in characteristics since the plurality of light-receiving elements behaves in the same manner. For example, among the plurality of light-receiving elements, the signal emitted by the light-receiving element that detects light in the wavelength band absorbed by the detection target can be used as the main signal, and the signal emitted by the light-receiving element that detects light in the wavelength band not absorbed by the detection target can be used as the reference signal. The main signal is subject to changes in signal intensity due to changes in temperature and humidity and also to attenuation of light intensity by the detection target. In contrast, the reference signal is subject to changes in signal intensity due to changes in temperature and humidity. Therefore, by comparing these two signals, the concentration of the detection target can be accurately calculated. Here, it suffices for the wavelengths of light used to obtain the main signal and the reference signal to differ in terms of the degree of light absorption by the detection target. The difference is preferably large, since the greater the difference in the degree of light absorption, the easier it becomes to suppress fluctuations. In the case of a plurality of detection targets, the plurality of light-receiving elements can detect light of different wavelengths. Since the plurality of detection targets exhibits different absorption at different wavelengths, the concentration of the plurality of detection targets can be calculated by analyzing the plurality of signals obtained from the plurality of light-receiving elements using multivariate analysis.

<Optical Path>

The optical path is configured by light emitted from the light-emitting element in different radiation directions reaching a plurality of different positions. In the present embodiment, the optical path is configured by reflecting light with a reflector. In other words, the reflector causes light emitted from the light-emitting element in different radiation directions to reach a plurality of different positions. The configuration of the reflector is not limited to a single mirror but includes, for example, providing a plurality of reflective mirrors that are optical elements (light guiding members) and that reflect light radiated in different directions to different positions. The reflector may have a reflective surface that is a quadratic surface. The reflector may include metal as the reflective surface integrally formed on top of resin. For example, the optical element may be a reflective mirror that combines parabolic, elliptical, spherical, and other such shapes. Such a configuration can focus light incident on the mirror so that the light reaches the light-receiving elements. Furthermore, the reflective mirror may include a plane mirror. Other optical elements such as a lens, diffraction grating, and the like may be inserted along the optical path. The optical physical quantity measuring apparatus according to the present embodiment is configured to include at least a reflective mirror. In other words, the optical path is configured using optical elements including at least a reflective mirror. A mirror with high reflectance may be formed on a portion of an enclosure forming part of the optical physical quantity measuring apparatus. Specifically, the mirror with high reflectance formed on a portion of the enclosure is preferably a resin housing coated with an alloy including aluminum, gold, or silver, a dielectric, or a laminate of these materials. Examples of the material of the resin housing include LCP (liquid crystal polymer), PP (polypropylene), PEEK (polyether ether ketone), PA (polyamide), PPE (polyphenylene ether), PC (polycarbonate), PPS (polyphenylene sulfide), PMMA (polymethyl methacrylate resin), PAR (polyarylate resin), or the like, or a hard resin yielded by mixing of two or more of these. A resin housing coated with gold or an alloy layer containing gold is preferable from the perspective of reliability and aging. To prevent light with a wavelength that should not reach the plurality of light-receiving elements (unnecessary light) from reaching the plurality of light-receiving elements, a configuration in which a void is provided or a material with low reflectance is formed in a portion of the optical path may also be adopted. The material with low reflectance may be a portion of uncoated resin forming the reflective mirror.

The optical path may allow light emitted from both of two light-emitting elements to reach the same position. By causing light from both of two light-emitting elements to be received by the same light-receiving element, the number of pairs of light-receiving and light-emitting elements can be reduced, thereby achieving provision of a compact yet highly accurate optical physical quantity measuring apparatus.

<Wavelength Limiting Means>

Various methods can be used as wavelength limiting means. For example, an optical interference filter using a dielectric multilayer film, such as a bandpass filter, changes the transmission spectrum with respect to the angle of incidence. In general, the transmitted wavelength band of obliquely incident light is shifted to the short wavelength side as compared to vertically incident light. Therefore, by providing a bandpass filter for a light source such that the spectrum does not change with the radiation direction, and by using light transmitted through the bandpass filter, different radiation spectra can be provided to light emitted in different directions. Here, a light source such that the spectrum does not change with the radiation direction is, for example, an ordinary lamp light source or a light-emitting diode light source. A metamaterial using a diffraction grating or microstructure can also be used as the wavelength limiting means. By use of these wavelength limiting means, a plurality of lights with different radiation spectra depending on the radiation direction can be extracted from a single light source.

In a case in which the light-emitting element includes the wavelength limiting means, the optical physical quantity measuring apparatus uses the light that is transmitted or reflected by the wavelength limiting means among the light emitted from the light-emitting element. Since the light emitted by the light-emitting element diffuses radially from the light-emission point, the wavelength limiting means is preferably provided in proximity to the light-emitting element so that the wavelength limiting means can be made smaller. Here, proximity means that the light-emitting element and the wavelength limiting means are connected via a connector and function integrally as a light-emitting element. Specifically, this applies to a case in which a bandpass filter is used as a window member for emission in a light-emitting element housed in a can package or ceramic package, for example. Also, the case of a structure containing the bandpass filter being adhered in a light-emitting element sealed by a molded resin is also included.

The wavelength limiting means is preferably in physical contact with the light-emitting element to reduce size and costs. As an example, in a case in which the light-emitting element is a light-emitting diode, such physical contact can be achieved by directly forming the wavelength limiting means on the light-emitting surface of the light-emitting diode by microfabrication or by forming a dielectric multi-layer film through sputtering or vapor deposition. In a light-emitting element in which a light-emitting diode composed of a semiconductor thin film is formed on a semiconductor substrate, the wavelength limiting means is formed directly on the device surface side in the case of extracting light from the device surface side. In the case of extracting light from the substrate side, the wavelength limiting means can be formed directly on the substrate.

In a case in which an optical interference filter composed of a dielectric multilayer film is used as the wavelength limiting means, the incident angle dependence of the wavelength transmitted by the optical interference filter can be controlled by the dielectric material. For the purpose of the present disclosure, a material that has a large angular dependence, hence a material with a low refractive index, is preferably used. For example, oxide materials such as $SiO_2$, $TiO_2$, and $Al_2O_3$ and nitride materials such as SiN have a refractive index of less than 2.5 in the infrared wavelength range. The incident angle dependence can therefore be larger than that of Ge (refractive index of 4.0), which is widely used. Here, the refractive index refers to the refractive index in the wavelength range of the light that is used.

<Molded Resin Part>

The molded resin part seals at least a portion of the plurality of light-receiving elements. Molded resin sealing technology is used to produce compact, low-cost electronic and optical components. By being sealed by the molded resin part, the light-receiving elements are affected by thermal stress and moisture absorption stress due to differences in the linear expansion coefficient and moisture absorption coefficient between the light-receiving elements and the molded resin part. However, by comparing a plurality of signals obtained from a plurality of light-receiving elements, it is possible to compensate for the effects of fluctuations.

A plurality of light-receiving elements may be sealed by a single molded resin part. A plurality of light-receiving elements formed on the same semiconductor substrate may be sealed by a single molded resin part. Furthermore, a plurality of light-receiving elements arranged inside the molded resin part is preferably positioned in a symmetrical arrangement in plan view. This is because the effect of the molded resin part on the plurality of light-receiving elements can be made equal, making it possible to compensate for the effect of fluctuations in the characteristics of the light-receiving elements.

Epoxy resin, phenolic resin, or the like, for example, may be used as the material of the molded resin part. The molded resin part may also contain filler material such as $SiO_2$ or $Al_2O_3$. Furthermore, a stress relieving layer such as polyimide or silicone resin may be included between the molded resin part and the plurality of light-receiving elements.

<Second Wavelength Limiting Means>

The light-receiving element may be provided with a second wavelength limiting means. The second wavelength limiting means may be the same as or different from the wavelength limiting means (first wavelength limiting means) provided in the light-emitting element. The wavelength limiting means of the plurality of light-receiving elements may be the same or different for each light-receiving element. Although the light-receiving elements receive light of different radiation spectra according to the radiation direction of the light-emitting element, additional provision of the second wavelength limiting means increases the wavelength selectivity and improves performance as an optical physical quantity measuring apparatus. In this case, the light reaching the light-receiving element is already selected for wavelength by the wavelength limiting means provided in the light-emitting element. The specifications for the second wavelength limiting means can therefore be relaxed. For example, a bandpass filter in which the design of the stopband is omitted and only the transmission bandwidth is designed can be used as the second wavelength limiting means.

Embodiments of the present disclosure will be described below with reference to the drawings. In the following description of the drawings, identical or similar parts are labeled with identical or similar symbols, and redundant explanations are omitted. The vertical/horizontal ratio of each configuration illustrated in the drawings may be exaggerated from the actual ratio for the sake of explanation.

First Embodiment

FIG. 1 is a configuration diagram illustrating an optical physical quantity measuring apparatus 1 according to a first embodiment of the present disclosure. As illustrated in FIG. 1, the optical physical quantity measuring apparatus 1 according to the present embodiment includes a light-emitting element L, two light-receiving elements S, and an optical path 4. In the description with reference to FIG. 1 and subsequent drawings, the two light-receiving elements S may be described as a light-receiving element Sm (first light-receiving element) and light-receiving element Sr (second light-receiving element) to distinguish therebetween. A plurality of optical paths 4 may be differentiated as an optical path 4A, an optical path 4B, and the like. The light-emitting element L may also be described as a light-emitting element L1 to differentiate from another light-emitting element L2, described below. The curve drawn at the top of the drawing is a reflector, which is configured by optical elements (reflective mirrors) that allow light of different radiation directions to reach different positions. The reflector is configured by components such as a plurality of reflective mirrors having reflective surfaces with different curvatures and the like but is illustrated as a simplified curve in the drawing. For light that is emitted in a different direction from the optical paths 4A and 4B in the drawing and that is not intended to reach the two light-receiving elements, a configuration is preferably adopted to provide an absorber or a void in the reflective mirror to reduce the reflectance, or to design the optical path so that the light reaches a different position than the two light-receiving elements. While an absorber or void is preferably provided in any of the embodiments, the details of the absorber and void configuration are provided below as the sixth embodiment.

Light emitted in a certain direction from the light-emitting element L is guided by the optical path 4A to one light-receiving element Sm. Light emitted in another direction from the light-emitting element L is guided by the optical path 4B to another light-receiving element Sr. The signal detected by the light-receiving element Sm can be designated as the "main signal (Sm)" and the signal detected by the light-receiving element Sr as the "reference signal (Sr)".

Second Embodiment

Figure 2:
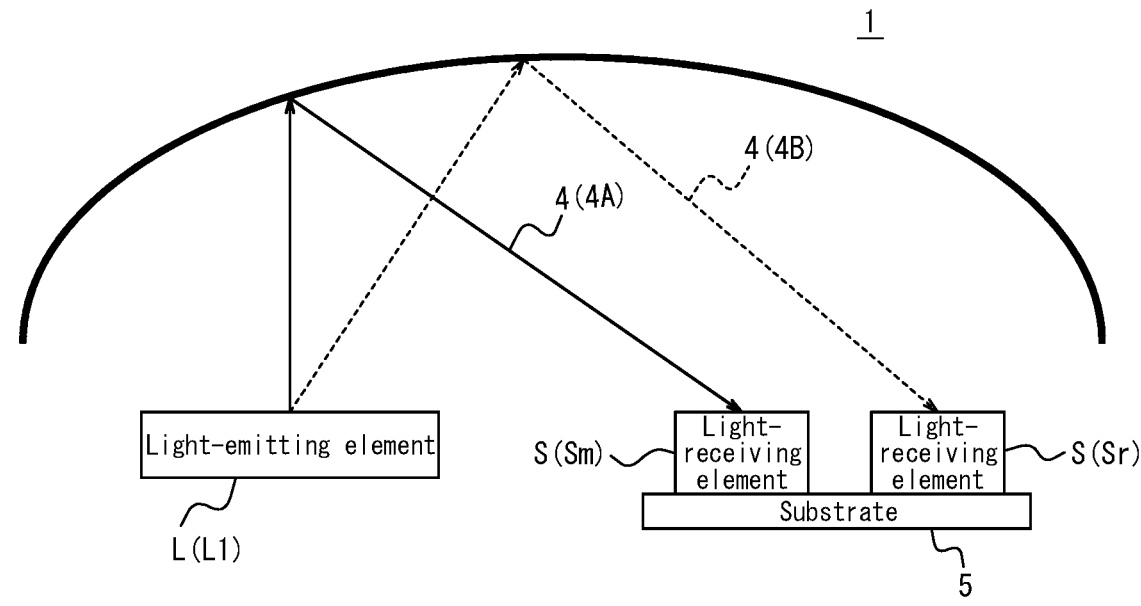
FIG. 2 is a configuration diagram illustrating an optical physical quantity measuring apparatus according to an embodiment.

FIG. 2 is a configuration diagram illustrating an optical physical quantity measuring apparatus 1 according to a second embodiment of the present disclosure. As illustrated in FIG. 2, the optical physical quantity measuring apparatus 1 according to the present embodiment includes a light-emitting element L, two light-receiving elements S, and an optical path 4. Light emitted in a certain direction from the light-emitting element L is guided by the optical path 4A to one light-receiving element Sm. Light emitted in another direction from the light-emitting element L is guided by the optical path 4B to another light-receiving element Sr. The two light-receiving elements S are formed on the same substrate 5.

Third Embodiment

Figure 3:
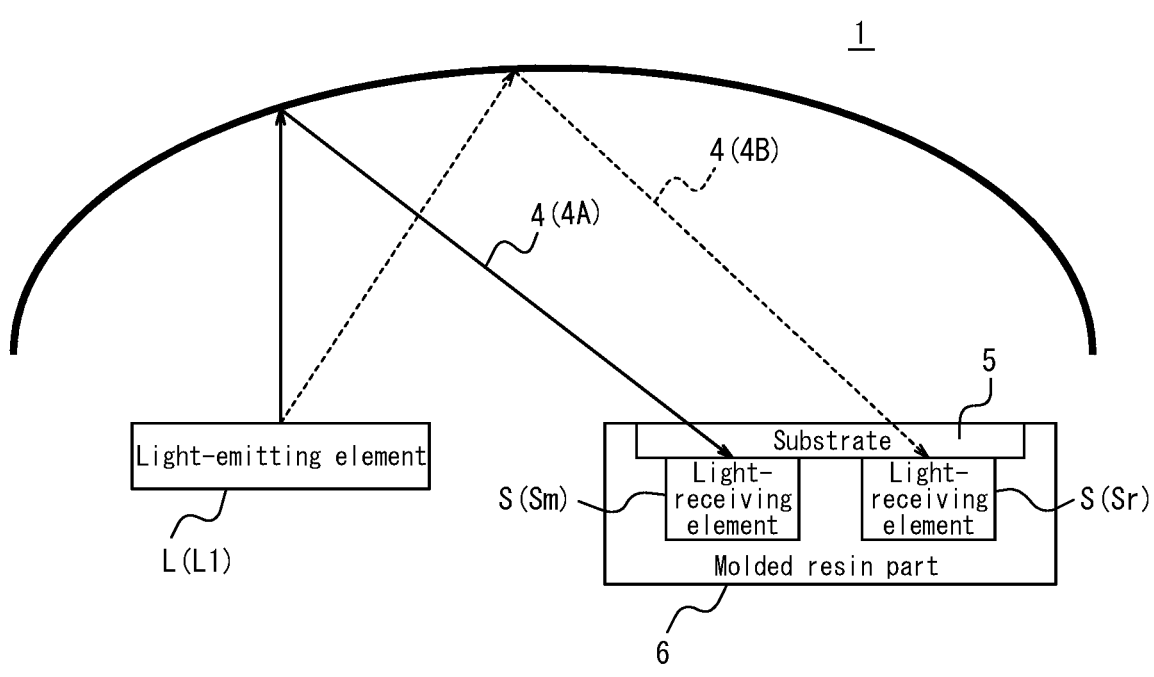
FIG. 3 is a configuration diagram illustrating an optical physical quantity measuring apparatus according to an embodiment.

FIG. 3 is a configuration diagram illustrating an optical physical quantity measuring apparatus 1 according to a third embodiment of the present disclosure. As illustrated in FIG. 3, the optical physical quantity measuring apparatus 1 according to the present embodiment includes a light-emitting element L, two light-receiving elements S, and an optical path 4. Light emitted in a certain direction from the light-emitting element L is guided by the optical path 4A to one light-receiving element Sm. Light emitted in another direction from the light-emitting element L is guided by the optical path 4B to another light-receiving element Sr. The two light-receiving elements S are formed on a substrate 5, which is a semiconductor substrate, and a portion thereof is sealed by a molded resin part 6. Since the substrate 5 is transparent relative to the light guided by the optical path 4, the light-receiving elements S receive the light transmitted through the substrate 5.

Fourth Embodiment

Figure 4:
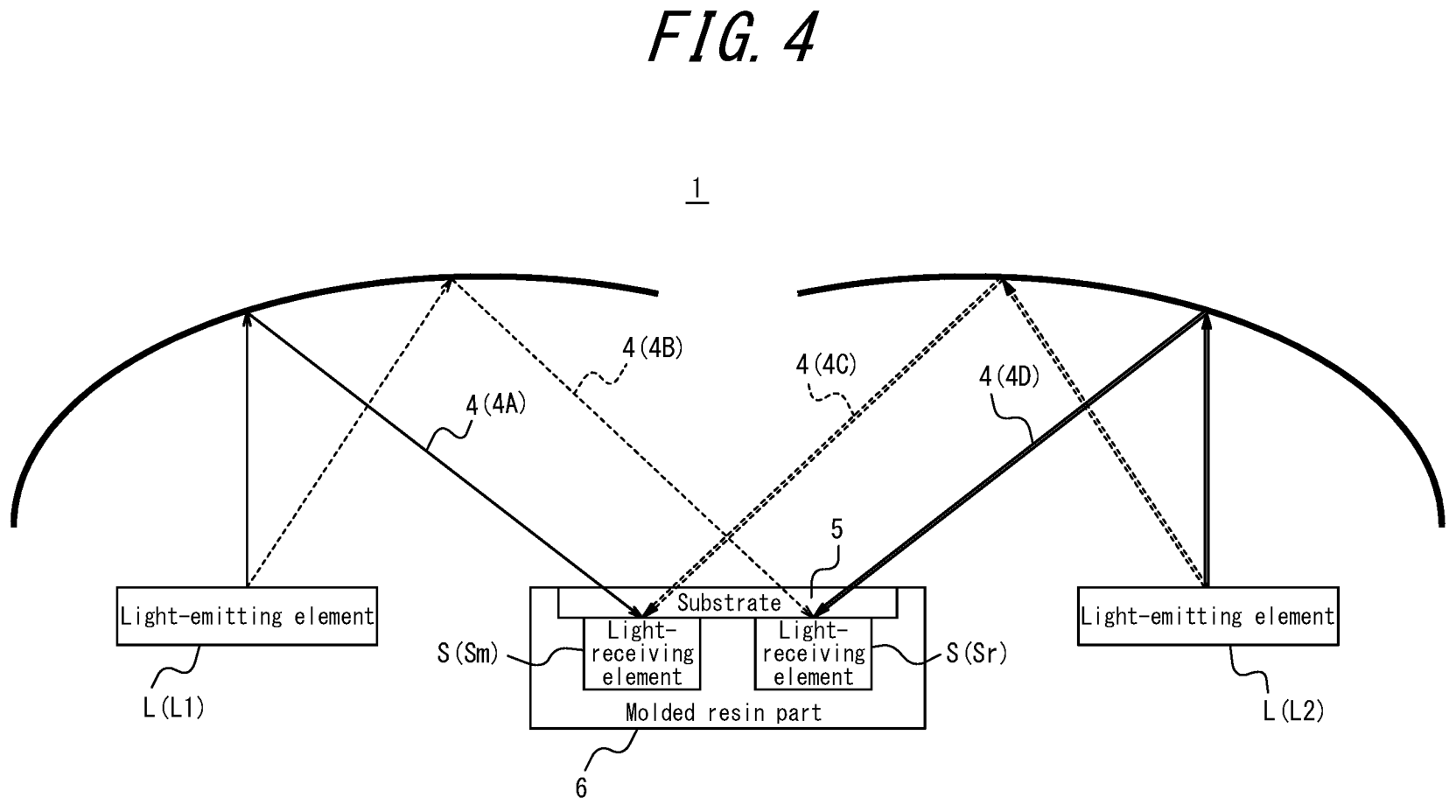

FIG. 4 is a configuration diagram illustrating an optical physical quantity measuring apparatus 1 according to a fourth embodiment of the present disclosure. As illustrated in FIG. 4, the optical physical quantity measuring apparatus 1 according to the present embodiment includes two light-emitting elements L, two light-receiving elements S, and an optical path 4. Light emitted in a certain direction from the first light-emitting element L1 is guided by the optical path 4A to one light-receiving element Sm. Light emitted in another direction from the first light-emitting element L1 is guided by the optical path 4B to another light-receiving element Sr. Light emitted in a certain direction from the second light-emitting element L2 is guided by the optical path 4C to the light-receiving element Sm. Light emitted in another direction from the second light-emitting element L2 is guided by the optical path 4D to the light-receiving element Sr. In other words, light from the second light-emitting element L2 is guided to the two light-receiving elements S, respectively, according to the radiation direction of the light. Therefore, the plurality of light-receiving elements S is arranged at positions reached by light emitted from both of the two light-emitting elements L. The two light-receiving elements S are formed on a substrate 5, which is a semiconductor substrate, and a portion thereof is sealed by a molded resin part 6. Since the substrate 5 is transparent relative to the light guided by the optical path, the light-receiving elements S receive the light transmitted through the substrate 5. For example, from the first light-emitting element L1, light with wavelengths of 4.3 $\mu$m and 4.0 $\mu$m can reach the two light-receiving elements S via the optical paths 4A and 4B. From the second light-emitting element L2, light with wavelengths of 3.3 $\mu$m and 3.8 $\mu$m can reach the two light-receiving elements S via the optical paths 4C and 4D. Here, the 4.0 $\mu$m light and the 3.8 $\mu$m light correspond to light near 3.9 $\mu$m, for which the absorption of carbon dioxide and hydrocarbons is very small. By alternately driving the first light-emitting element L1 and the second light-emitting element L2, extracting signals from the two light-receiving elements S, and comparing the signals, the concentration of carbon dioxide, which exhibits absorption by 4.3 $\mu$m light, and the concentration of hydrocarbons, which exhibits absorption by 3.3 $\mu$m light, can be calculated.

Fifth Embodiment

Figure 5:
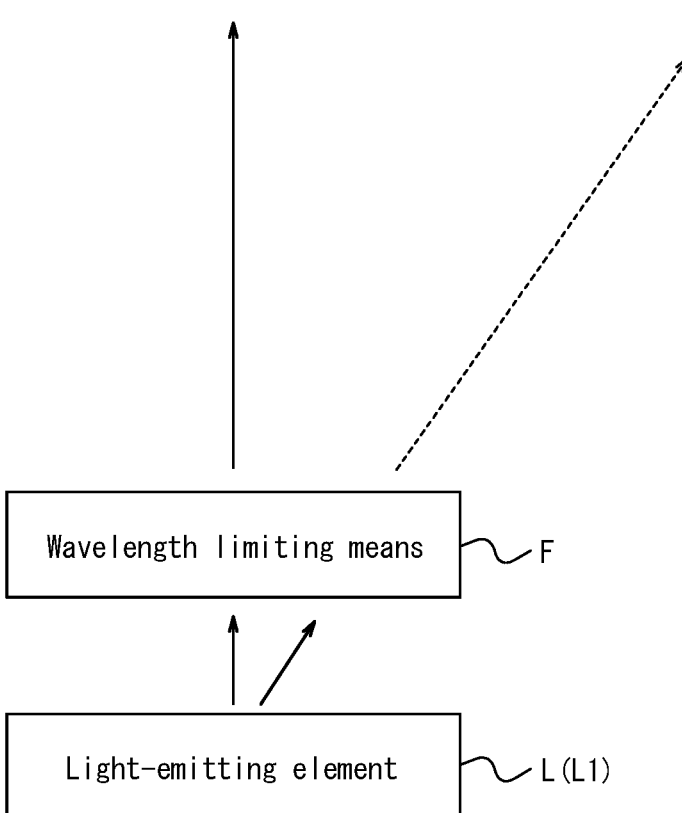
FIG. 5 is a configuration diagram illustrating the configuration of a light-emitting element.

FIG. 5 is a configuration diagram illustrating the configuration of a light-emitting element L in an optical physical quantity measuring apparatus 1 according to a fifth embodiment of the present disclosure. As illustrated in FIG. 5, the light-emitting element L is provided with wavelength limiting means F. The wavelength limiting means F has a different transmission spectrum depending on the angle of incidence. Provision of the wavelength limiting means F above a light source whose radiation spectrum does not change depending on the radiation direction, such as lamp light sources and light-emitting diode light sources, can yield different radiation spectra depending on the radiation direction. In other words, addition of the wavelength limiting means F can achieve a light-emitting element L that overall has a radiation spectrum that differs depending on the radiation direction.

Sixth Embodiment

Figure 6:
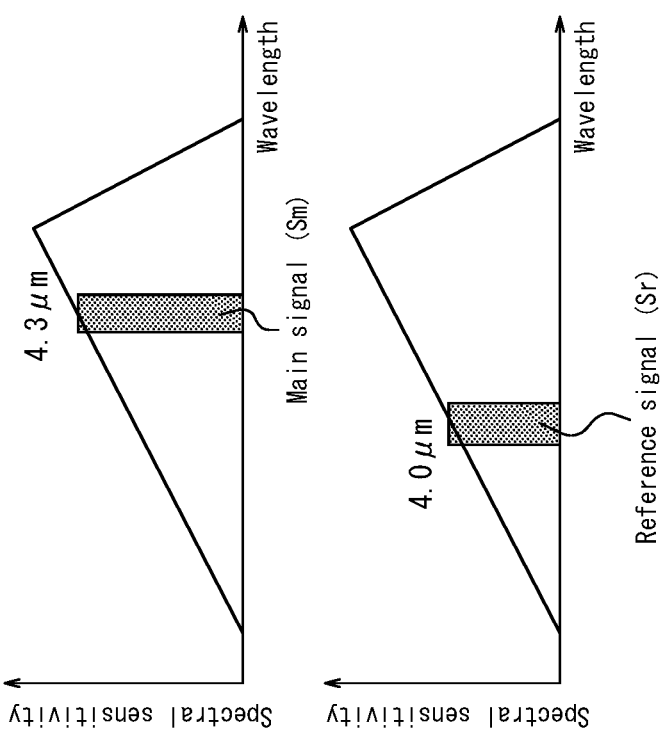
FIG. 6 is a diagram illustrating the configuration and principle of operation of an optical physical quantity measuring apparatus according to an embodiment.
Figure 6:
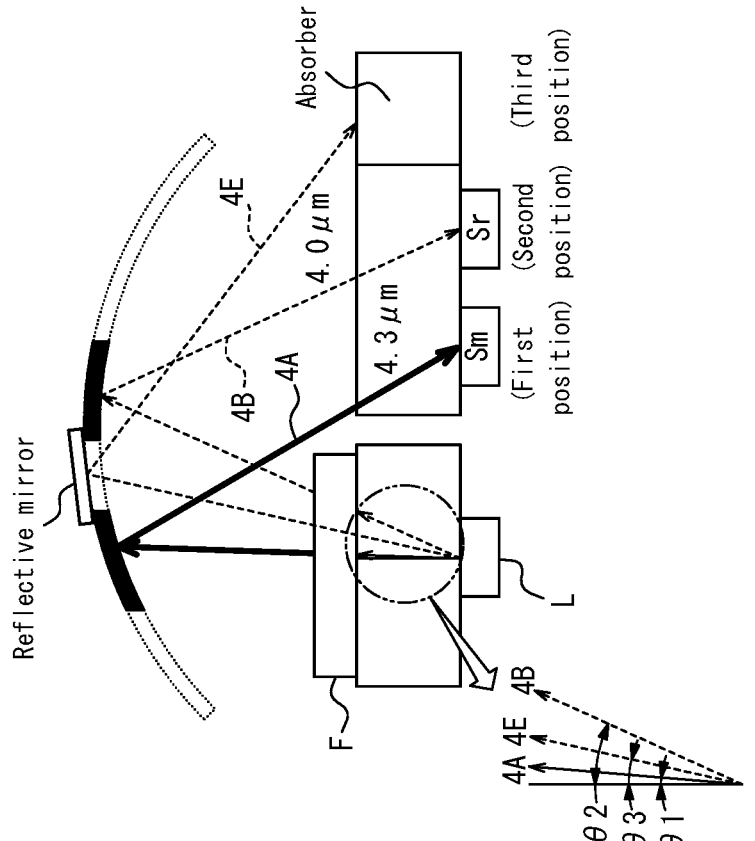

FIG. 6 illustrates the configuration and principle of operation of an optical physical quantity measuring apparatus 1 according to a sixth embodiment of the present disclosure. The left side of FIG. 6 is a configuration diagram illustrating the optical physical quantity measuring apparatus 1 according to the sixth embodiment of the present disclosure. The right side of FIG. 6 is a schematic diagram of the spectral sensitivity of light-receiving elements Sm and Sr. The optical physical quantity measuring apparatus 1 according to the sixth embodiment includes a light-emitting element L, two light-receiving elements Sm and Sr, and optical paths 4A, 4B, and 4E. The two light-receiving elements Sm and Sr are formed on the same semiconductor substrate and are produced by the same materials and process. The light-emitting element L is provided with a wavelength limiting means F and emits light of different wavelengths depending on the radiation direction. In the example in FIG. 6, the light is 4.3 μm and 4.0 μm. The optical path 4A allows light with a wavelength of 4.3 μm to reach the light-receiving element Sm. The optical path 4B allows light with a wavelength of 4.0 μm to reach the light-receiving element Sr. As illustrated on the right side of FIG. 6, the light-receiving element Sm detects light with a wavelength of 4.3 μm and obtains a main signal (Sm). The light-receiving element Sr detects light with a wavelength of 4.0 μm and obtains a reference signal (Sr).

Here, the optical path is preferably designed so that light that is not desired to reach the two light-receiving elements (hereinafter referred to as "interfering light") reaches a different position from the two light-receiving elements by, for example, providing an absorber or a void at a position close to the reflective mirror or light-receiving elements. The absorber can be configured by a substance with a lower reflectance than the reflective mirror. As a specific example, the absorber may be a portion of a molded resin part, a portion of uncoated resin forming the reflective mirror, or a portion of a printed board. The void needs to transmit light without reflecting the light. In the example in FIG. 6, the optical physical quantity measuring apparatus 1 includes a reflective mirror in the reflector so as to form an optical path 4E for interfering light. The interfering light reaches a third position different from the position of the light-receiving element Sm (first position) and the position of the light-receiving element (second position). An absorber is provided at the third position to suppress the interfering light from reaching the two light-receiving elements, thereby further improving sensitivity and accuracy.

As illustrated in FIG. 6, the light reaching the first position where the light-receiving element Sm is arranged is emitted from the light-emitting element L at a first radiation angle (θ1), with vertical radiation being 0°. The light reaching the second position where the light-receiving element Sr is arranged is emitted from the light-emitting element L at a second radiation angle (θ2). Light is also emitted from the light-emitting element L at a third radiation angle (θ3). The third radiation angle is an angle between the first radiation angle and the second radiation angle and satisfies the relationship θ1<θ3<θ2 in the example in FIG. 6. The light emitted from the light-emitting element L at the third radiation angle is particularly prone to becoming interfering light. The configuration illustrated in FIG. 6 can efficiently absorb the light emitted from the light-emitting element L at the third radiation angle with the absorber. Further improvement in sensitivity and accuracy can be achieved by designing the optical path so that light emitted at a radiation angle of θ2 or higher reaches an absorption band or void at the same or another position, so that the arrival of the interfering light at the two light-receiving elements is further suppressed.

Figure 12:
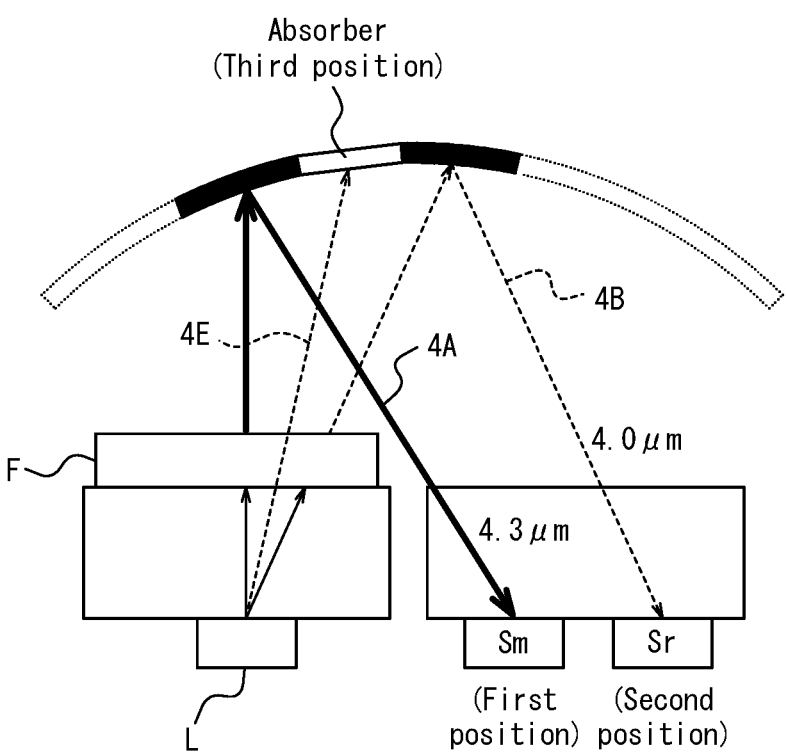
FIG. 12 illustrates an example of arrangement of an absorber.

FIG. 12 illustrates another example of arrangement of an absorber. The third position where the absorber is arranged may be a position in the reflector between the reflection position of the light emitted at the first radiation angle (θ1) and the reflection position of the light emitted at the second radiation angle (θ2). In other words, the reflector may be configured to include an absorber between reflective mirrors.

Figure 13:
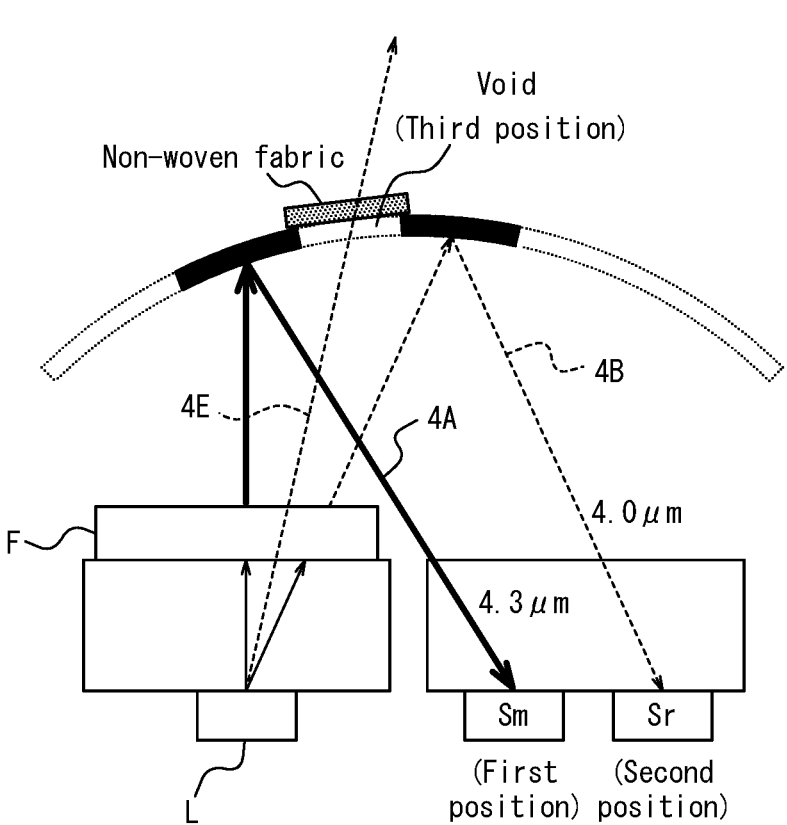
FIG. 13 illustrates an example of arrangement of a void.

FIG. 13 illustrates an example of arrangement of a void. The third position where the void is arranged may be a position in the reflector between the reflection position of the light emitted at the first radiation angle (θ1) and the reflection position of the light emitted at the second radiation angle (θ2). In other words, the reflector may be configured to include a void between reflective mirrors. The void may be covered with a non-woven fabric or other material to prevent dust and the like from entering the interior space. In this case, the void may be used as a vent to introduce gas or liquid into the interior space.

Figure 14:
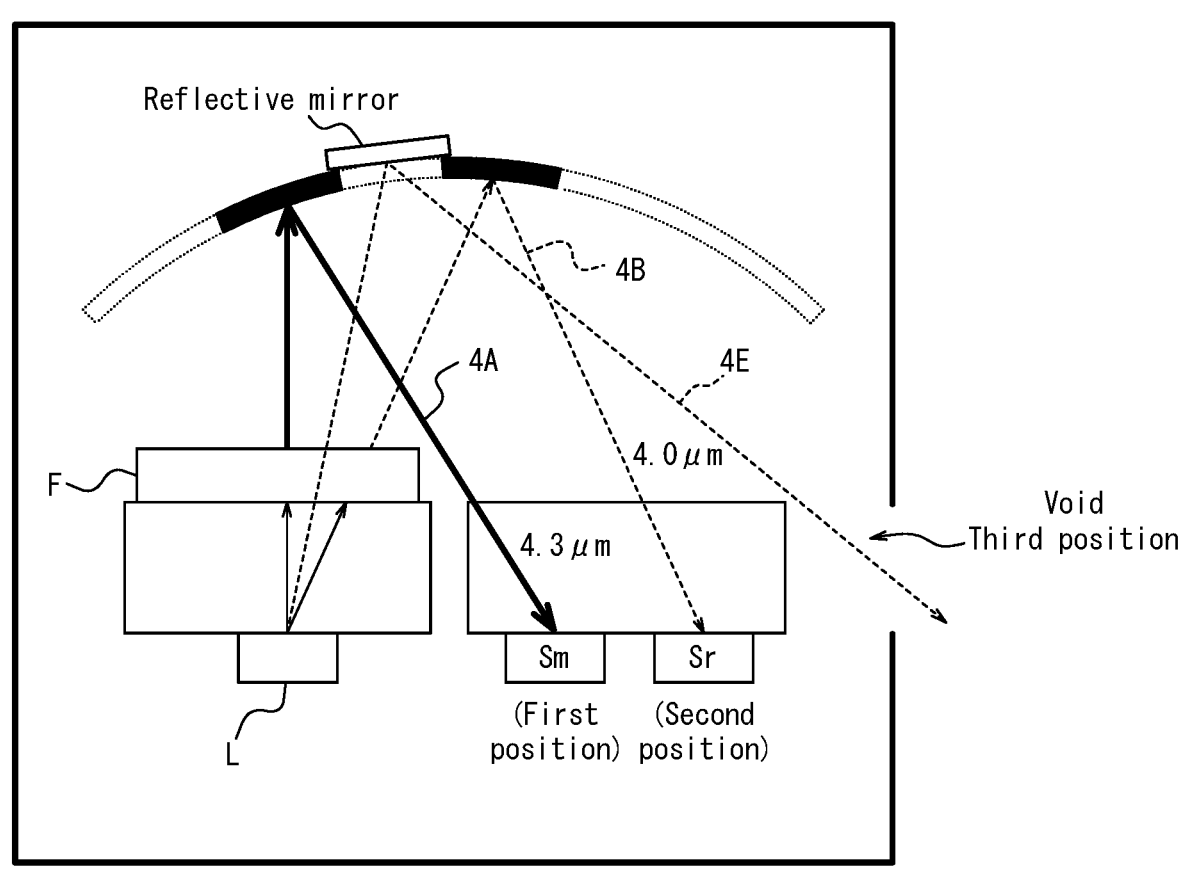
FIG. 14 illustrates another example of arrangement of a void.

FIG. 14 illustrates another example of arrangement of a void. In the example in FIG. 14, as in FIG. 6, a reflective mirror is provided in the reflector so as to form the optical path 4E for interfering light. The interfering light reaches a third position different from the position of the light-receiving element Sm (first position) and the position of the light-receiving element (second position). A void is provided at the third position to suppress the interfering light from reaching the two light-receiving elements, thereby further improving sensitivity and accuracy.

As illustrated in FIG. 6 and FIG. 14, the optical physical quantity measuring apparatus 1 is configured so that the light-emitting element L emits light at least at the first radiation angle (θ1), the second radiation angle (θ2), and the third radiation angle (θ3) into the space occupied by the object to be measured. The first light-receiving element is arranged at a first position reached by light emitted from the light-emitting element L at the first radiation angle. The second light-receiving element is arranged at a second position reached by light emitted from the light-emitting element L at the second radiation angle. An absorber or a void is provided at a third position reached by light emitted from the light-emitting element L at the third radiation angle. Here, the first position, second position, and third position are positions in the optical paths of the respective radiation angles. Hence, in other words, the first light-receiving element is arranged in the optical path along which the light emitted at the first radiation angle travels, the second light-receiving element is arranged in the optical path along which the light emitted at the second radiation angle travels, and the absorber or void is provided in the optical path along which the light emitted at the third radiation angle travels.

EXAMPLES

Example 1

Figure 7:
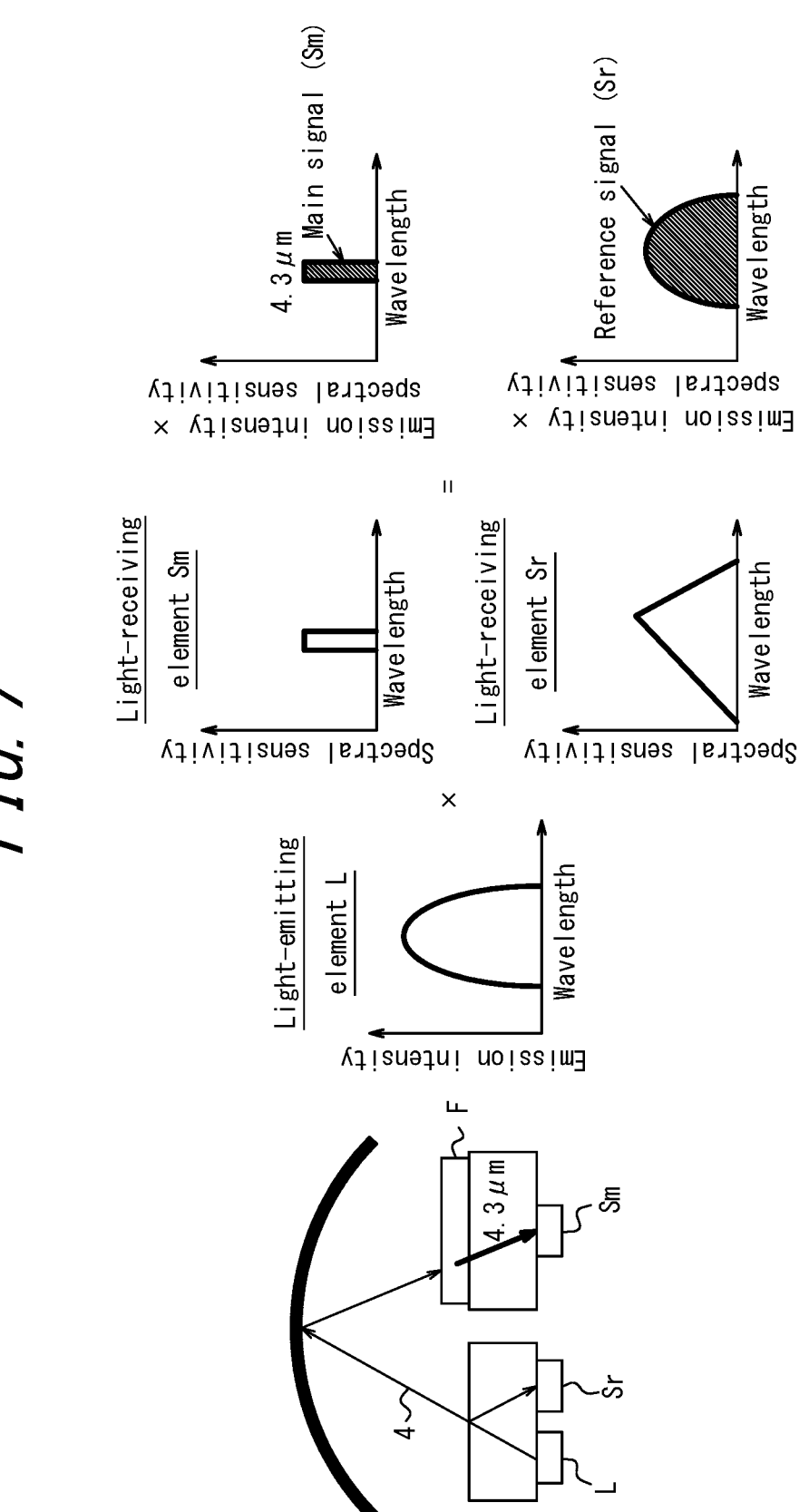
FIG. 7 is a diagram illustrating the configuration and principle of operation of a Comparative Example.

Example 1 uses a light-emitting diode and photodiodes made of AlInSb formed on a GaAs substrate as the light-emitting element L and two light-receiving elements Sm and Sr in the sixth embodiment. FIG. 7 illustrates the configuration and principle of operation of a Comparative Example. The leftmost diagram in FIG. 7 is a configuration diagram illustrating an optical physical quantity measuring apparatus 1 in the Comparative Example. The other diagrams in FIG. 7 are schematic diagrams of signals in the Comparative Example. The signals are spectral integral values obtained by multiplying the emission intensity by the spectral sensitivity, i.e., the emission intensity of the light-emitting element L (which exhibits a substantially Gaussian distribution) and the spectral sensitivity of the light-receiving elements Sm and Sr. The optical physical quantity measuring apparatus 1 according to the Comparative Example includes the light-emitting element L, the two light-receiving elements Sm and Sr, and the optical path 4. The light-receiving element Sm is provided with wavelength limiting means F and transmits only light of a specific wavelength. In the example in FIG. 7, only light with a wavelength of 4.3 µm is transmitted. The light-receiving element Sm detects the 4.3 µm light and obtains a main signal (Sm). The light-receiving element Sr, which is formed on the same semiconductor substrate as the light-emitting element L, detects light of all wavelengths determined by the spectra of the light-emitting element L and the light-receiving element Sr and obtains a reference signal (Sr). The light-emitting element L and the two light-receiving elements Sm and Sr in the Comparative Example are a light-emitting diode and photodiodes made of AlInSb formed on a GaAs substrate.

Figure 8:
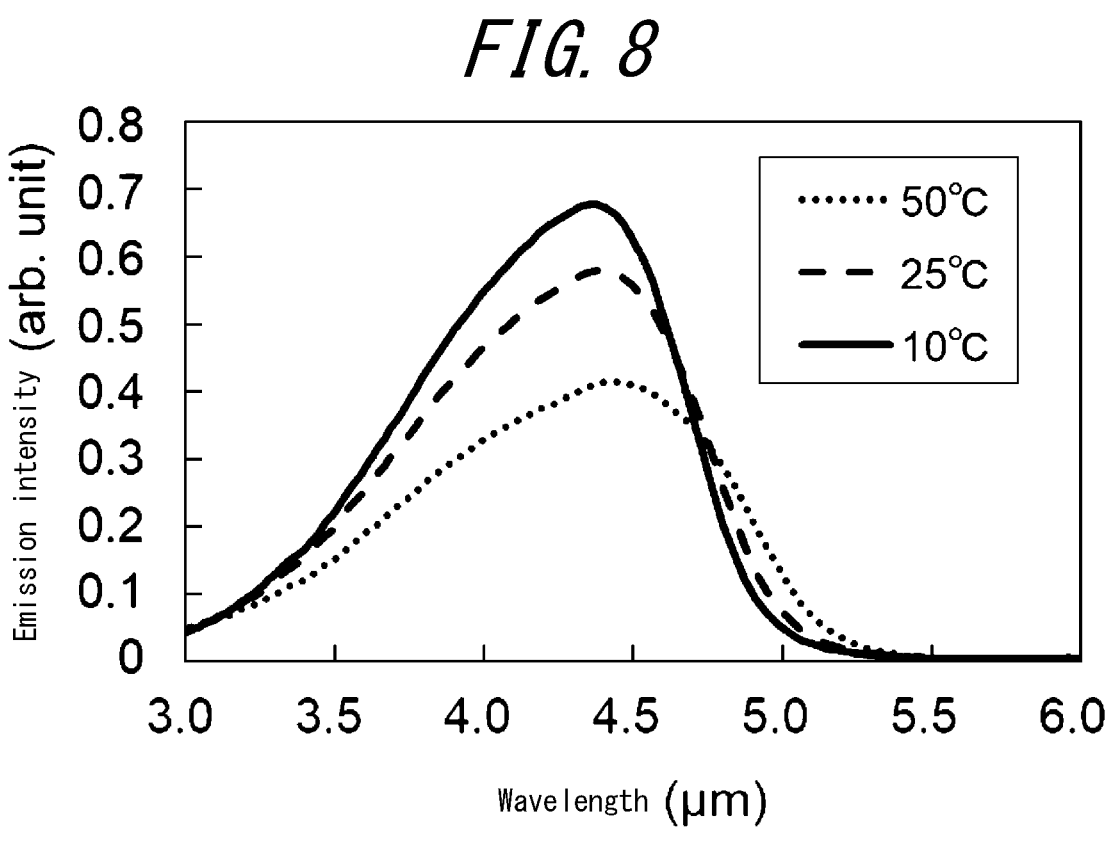
FIG. 8 is a diagram illustrating the temperature dependence of the emission spectrum of a light-emitting element.
Figure 9:
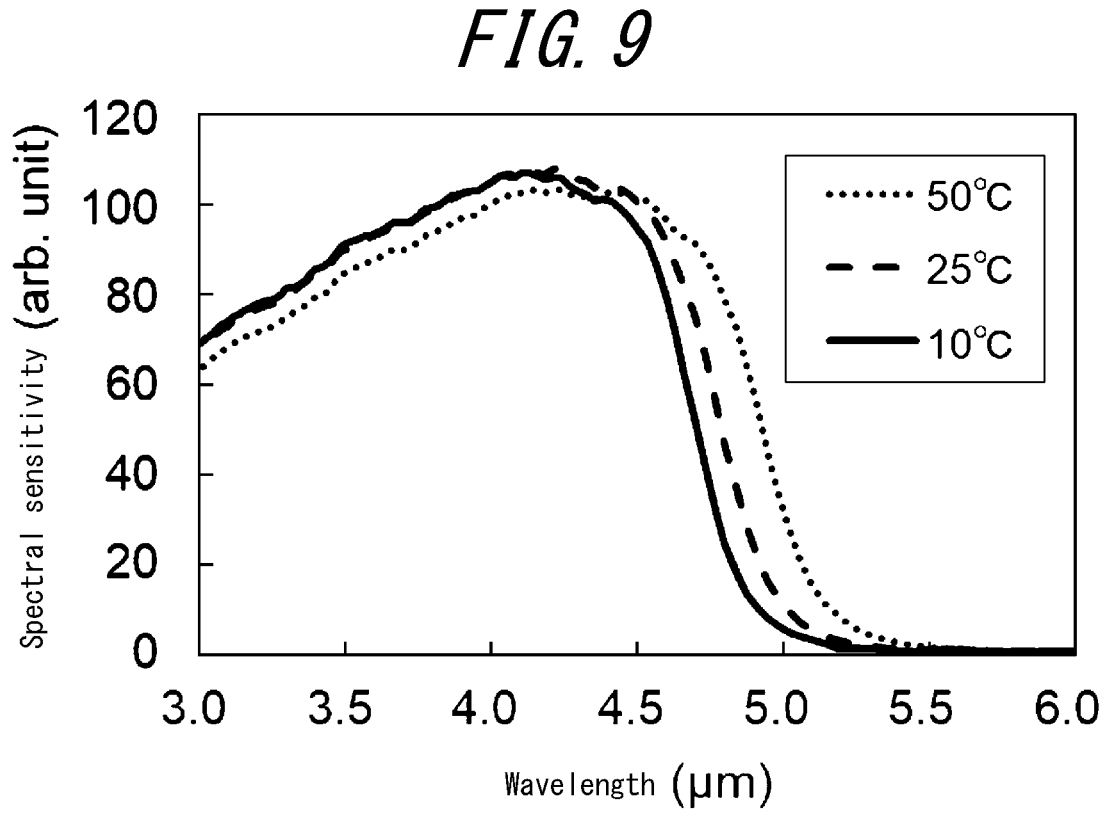
FIG. 9 is a diagram illustrating the temperature dependence of the spectral sensitivity spectrum of a light-receiving element.

FIG. 8 illustrates the temperature dependence of the emission spectrum of a light-emitting element L formed by an AlInSb light-emitting diode. As the temperature is increased, the emission intensity decreases and the long wavelength end of the emission shifts further towards the long wavelength side, changing the shape of the emission spectrum. FIG. 9 illustrates the temperature dependence of the spectral sensitivity spectrum of the light-receiving element S, which is formed by an AlInSb photodiode. As the temperature is increased, the spectral sensitivity decreases and the long wavelength end of the spectral sensitivity shifts further towards the long wavelength side, changing the shape of the spectral sensitivity spectrum.

Figure 10:
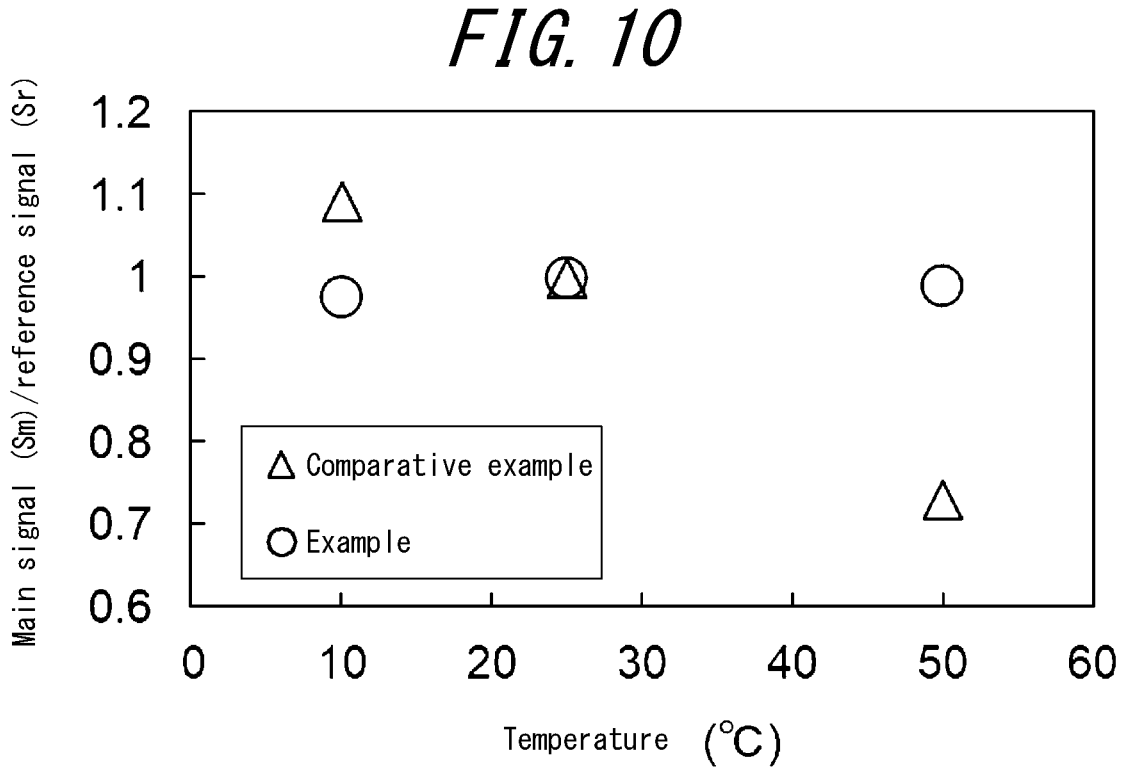
FIG. 10 is a diagram illustrating the temperature dependence of the signal ratio in the Example and Comparative Example.

FIG. 10 illustrates the temperature dependence of the signal ratio, i.e., main signal (Sm)/reference signal (Sr), in the Example and the Comparative Example. In Example 1, the main signal (Sm) is a value determined by the product of the emission intensity of the light-emitting element L at a light wavelength of 4.3 µm and the spectral sensitivity of the light-receiving element Sm. The reference signal (Sr) is a value determined by the product of the emission intensity of the light-emitting element L at a light wavelength of 4.0 µm and the spectral sensitivity of the light-receiving element Sr.

In the Comparative Example, as in the Example, the main signal (Sm) is a value determined by the product of the emission intensity of the light-emitting element L at a light wavelength of 4.3 µm and the spectral sensitivity of the light-receiving element Sm. The reference signal (Sr), on the other hand, is obtained by integrating the product of the emission intensity of the light-emitting element L at each wavelength and the spectral sensitivity of the light-receiving element Sr over all of the wavelengths. In the Comparative Example, the signal ratio fluctuated from +10% to nearly −70% in response to an increase in temperature from 10° C. to 50° C. On the other hand, in Example 1, the fluctuation was suppressed to ±5% or less over the same temperature range. The suppression of fluctuation due to temperature dependence facilitates compensation for the temperature dependence of the signal and enables highly accurate detection of gas concentration in a gas sensor, for example.

In the case of attenuation of light in the optical path due to, for example, dirt or foreign matter in the optical path, only the light that generates the main signal (Sm) is transmitted through the optical path 4 in the Comparative Example. The signal ratio therefore fluctuates and becomes a cause of error in the calculation of physical quantities. On the other hand, in Example 1, both the light that generates the main signal (Sm) and the light that generates the reference signal (Sr) are transmitted through the optical path 4. The light therefore is attenuated in nearly the same way. Consequently, fluctuation in the signal ratio is suppressed, yielding smaller error in the calculation of physical quantities.

Example 2

Figure 11:
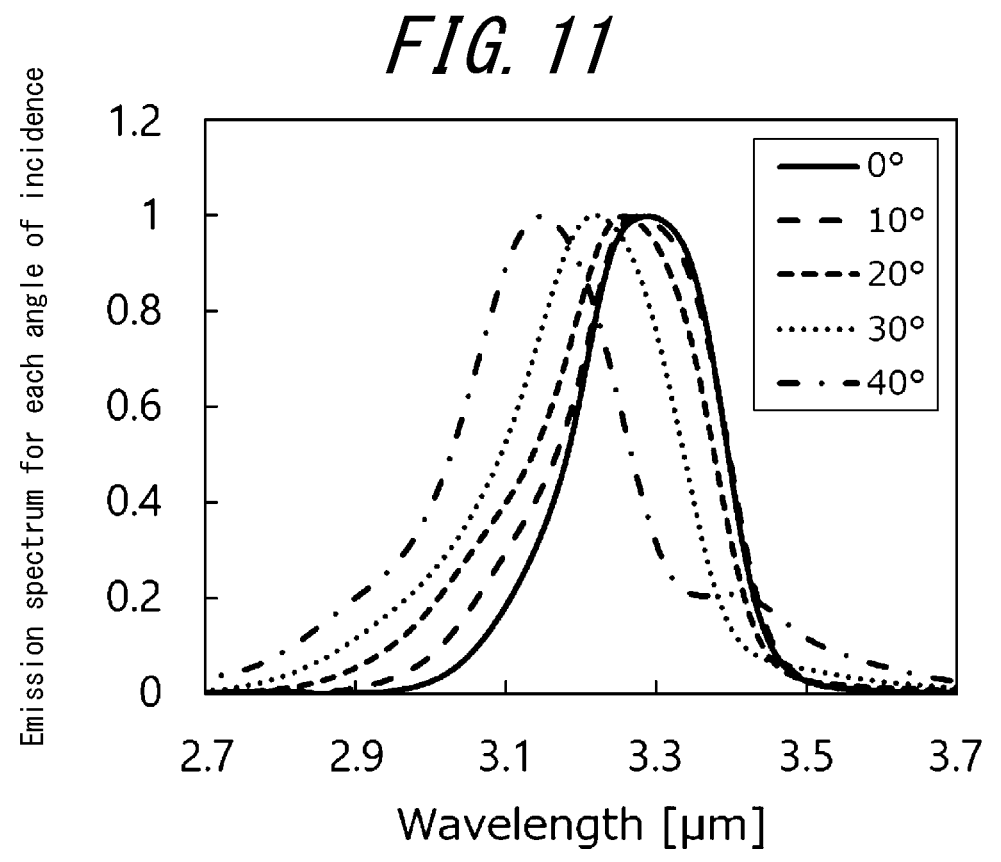
FIG. 11 is a diagram illustrating an example of the radiation angle dependence of the radiation spectrum of a light-emitting element.

FIG. 11 illustrates an example of the radiation angle dependence of the radiation spectrum of the light-emitting element L in the fifth embodiment. In the fifth embodiment, a light-emitting diode made of AlInSb is used as the light-emitting element L, and a bandpass filter transmitting light in the 3.3 µm band is used as the wavelength limiting means F. The light-emitting diode has a 0.7 mm square radiation surface. The bandpass filter has a 1.1 mm square incident surface and transmission surface. The bandpass filter is arranged in close proximity to the light-emitting diode L, at a position 0.5 mm away. This configuration can provide different radiation spectra depending on the radiation direction. Light emitted perpendicular to the light-emission surface has a radiation spectrum with a central wavelength near 3.3 µm, which overlaps greatly with the absorption wavelength band of hydrocarbon gases such as methane, for example. In contrast, light emitted in a direction inclined 40 degrees from the vertical direction has a central wavelength near 3.15 µm and thus has little overlap with the absorption wavelength band of hydrocarbon gases. Therefore, two signals with different sensitivities to the hydrocarbon gas concentration can be obtained by allowing light near 0 degrees and near 40 degrees to reach the two light-receiving elements S.

As described above, the optical physical quantity measuring apparatus 1 according to the above embodiment can measure physical quantities with high accuracy while remaining compact. In addition, by provision of the aforementioned absorber or void in the optical physical quantity measuring apparatus 1, the arrival of interfering light to the light-receiving element can be effectively suppressed, enabling measurement of physical quantities with even higher accuracy.

Although embodiments of the present disclosure have been described based on the various drawings and Examples, it should be noted that a person of ordinary skill in the art could easily make various modifications and revisions based on the present disclosure. Accordingly, such modifications and revisions should also be considered to be included within the scope of the present disclosure. For example, functions and the like included in various constituent parts, etc., may be rearranged so long as they are logically consistent. Moreover, a plurality of constituent parts, etc., may be combined as a single part or may be split up.

The operations related to gas concentration measurement, including the aforementioned calculation of the signal ratio, are performed by an arithmetic unit, for example. The optical physical quantity measuring apparatus 1 may be configured with or without an arithmetic unit. The arithmetic unit may be configured by an Integrated Circuit (IC) or the like provided with a processor or may be configured by a computer or the like. The arithmetic unit acquires signals from the light-receiving element S. The arithmetic unit may further have a control function and may control the light emission by the light-emitting element L, for example. In the case of being an IC, the arithmetic unit may be mounted on the substrate 5.

The invention claimed is:

1. An optical physical quantity measuring apparatus comprising:

a light-emitting element, a plurality of light-receiving elements including at least a first light-receiving element and a second light-receiving element, and a reflector, wherein the light-emitting element has a different radiation spectrum depending on a radiation direction, and emits light at least at a first radiation angle, a second radiation angle, and a third radiation angle into a space in which an object to be measured is located, the reflector causes light emitted from the light-emitting element in different radiation directions to reach a plurality of different positions, the first light-receiving element is arranged in an optical path along which the light emitted at the first radiation angle travels, the second light-receiving element is arranged in an optical path along which the light emitted at the second radiation angle travels, and an absorber or a void is provided in an optical path along which the light emitted at the third radiation angle travels.

2. The optical physical quantity measuring apparatus according to claim 1, wherein the plurality of light-receiving elements is formed on a same substrate.

3. The optical physical quantity measuring apparatus according to claim 2, wherein the substrate is a semiconductor substrate, and the light-receiving elements are semiconductor elements formed on the semiconductor substrate.

4. The optical physical quantity measuring apparatus according to claim 1, further comprising a molded resin part that seals at least a portion of the plurality of light-receiving elements.

5. The optical physical quantity measuring apparatus according to claim 4, wherein the plurality of light-receiving elements is arranged symmetrically with respect to the molded resin part in plan view.

6. The optical physical quantity measuring apparatus according to claim 1, wherein the light-emitting element comprises wavelength limiting means, and the light-emitting element has the different radiation spectrum depending on the radiation direction due to incident angle dependence of a wavelength transmitted by the wavelength limiting means.

7. The optical physical quantity measuring apparatus according to claim 6, wherein the wavelength limiting means is an optical interference filter using a dielectric multilayer film.

8. The optical physical quantity measuring apparatus according to claim 7, wherein the dielectric multilayer film is formed from a material with a refractive index of less than 2.5.

9. The optical physical quantity measuring apparatus according to claim 6, wherein the wavelength limiting means is a diffraction grating.

10. The optical physical quantity measuring apparatus according to claim 6, wherein the wavelength limiting means is a metamaterial.

11. The optical physical quantity measuring apparatus according to claim 6, wherein the wavelength limiting means is provided in proximity to the light-emitting element.

12. The optical physical quantity measuring apparatus according to claim 1, wherein a light-emitting region of the light-emitting element includes a microstructure.

13. The optical physical quantity measuring apparatus according to claim 1, wherein the light-emitting element is a resonant-cavity light-emitting diode or a vertical cavity surface emitting laser.

14. The optical physical quantity measuring apparatus according to claim 1, wherein the light-emitting element and the plurality of light-receiving elements have a reception and emission wavelength of 1 μm to 12 μm, and a gas concentration is calculated based on an amount of light absorption by gas molecules present in an optical path.

15. The optical physical quantity measuring apparatus according to claim 1, further comprising a plurality of light-emitting elements, wherein at least one of the plurality of light-receiving elements is arranged at a position reached by light emitted from both of two light-emitting elements in the plurality of light-emitting elements.

16. The optical physical quantity measuring apparatus according to claim 1, wherein the reflector has a reflective surface that is a quadratic surface.

17. The optical physical quantity measuring apparatus according to claim 1, wherein the third radiation angle is an angle between the first radiation angle and the second radiation angle.

18. The optical physical quantity measuring apparatus according to claim 1, wherein the absorber is provided in the optical path along which the light emitted at the third radiation angle travels, and the absorber is a portion of a molded resin part that seals at least a portion of the plurality of light-receiving elements or the absorber is a portion of the molded resin part that forms the reflector.

19. The optical physical quantity measuring apparatus according to claim 1, wherein the absorber or the void is provided at a position in the reflector between a reflection position of the light emitted at the first radiation angle and a reflection position of the light emitted at the second radiation angle.

20. The optical physical quantity measuring apparatus according to claim 19, wherein the absorber is provided in the optical path along which the light emitted at the third radiation angle travels, and the absorber is a portion of uncoated resin forming the reflector.

* * * * *